(12) United States Patent
Venskus

(10) Patent No.: US 8,326,959 B2
(45) Date of Patent: Dec. 4, 2012

(54) VIRTUAL PRODUCTION TESTING OF LARGE INTEGRATED PRODUCTS

(75) Inventor: Mark Kenyon Venskus, Derby, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 742 days.

(21) Appl. No.: 12/554,526

(22) Filed: Sep. 4, 2009

(65) Prior Publication Data

US 2011/0060949 A1 Mar. 10, 2011

(51) Int. Cl.
*G06F 15/16* (2006.01)
*G01R 31/00* (2006.01)

(52) U.S. Cl. ....... 709/223; 709/224; 701/31.4; 702/118; 702/121; 702/123; 714/44; 714/E11.024; 714/741; 714/742; 370/401; 370/251

(58) Field of Classification Search .......... 709/223–224; 714/741–742, 44, E11.024; 702/118, 121, 702/123; 701/31.4; 370/401, 251
See application file for complete search history.

(56) References Cited

U.S. PATENT DOCUMENTS

| | | | | |
|---|---|---|---|---|
| 3,542,318 A | * | 11/1970 | Ellsworth | 244/103 S |
| 4,463,605 A | * | 8/1984 | McDowell et al. | 73/866.4 |
| 5,111,402 A | * | 5/1992 | Brooks et al. | 701/29.2 |
| 6,269,319 B1 | * | 7/2001 | Neisch et al. | 702/118 |
| 6,301,835 B1 | * | 10/2001 | Pfeiffer et al. | 49/502 |
| 6,401,049 B1 | * | 6/2002 | Ehmer | 702/119 |
| 6,816,728 B2 | * | 11/2004 | Igloi et al. | 455/431 |
| 7,006,032 B2 | * | 2/2006 | King et al. | 342/29 |
| 7,197,430 B2 | * | 3/2007 | Jacques et al. | 702/184 |
| 7,406,050 B2 | * | 7/2008 | Calluaud et al. | 370/250 |
| 8,078,055 B1 | * | 12/2011 | Mazuk et al. | 398/66 |
| 8,190,727 B2 | * | 5/2012 | Henkel | 709/223 |
| 8,224,503 B2 | * | 7/2012 | Piolet et al. | 701/3 |
| 2002/0111720 A1 | * | 8/2002 | Holst et al. | 701/3 |
| 2003/0203734 A1 | * | 10/2003 | Igloi et al. | 455/431 |
| 2005/0156777 A1 | * | 7/2005 | King et al. | 342/29 |
| 2006/0126608 A1 | * | 6/2006 | Pereira et al. | 370/360 |
| 2006/0144997 A1 | * | 7/2006 | Schmidt et al. | 244/100 R |
| 2006/0215568 A1 | * | 9/2006 | Smith | 370/241 |
| 2007/0027589 A1 | * | 2/2007 | Brinkley et al. | 701/3 |
| 2007/0115938 A1 | * | 5/2007 | Conzachi et al. | 370/352 |
| 2007/0127521 A1 | * | 6/2007 | Sandell et al. | 370/466 |
| 2007/0183435 A1 | * | 8/2007 | Kettering et al. | 370/401 |

(Continued)

OTHER PUBLICATIONS

"Switched Ethernet Testing for Avionics Applications"; Bisson, Ken et al.; 2007.

*Primary Examiner* — Alina N. Boutah
(74) *Attorney, Agent, or Firm* — Hovey Williams LLP

(57) ABSTRACT

A communications system and method for testing components of an aircraft via Ethernet. The communications system may comprise one or more Ethernet links having software and hardware controls for timing, buffering, and messaging, and a dedicated Ethernet line. The Ethernet links may be configured to communicably link sections of a central communication system of the aircraft, each section being part of a separate aircraft component. The Ethernet links may also communicably link the sections with various databases over the Ethernet line. The databases may comprise loadable software, archived testing data, configuration data, and/or diagnostic data. Any of the central communication system sections and the databases may be located at geographically distant locations from each other, such as at separate production sites. The communications system may allow the aircraft components to test each other, or essentially for the aircraft to test itself prior to its components being physically joined together.

16 Claims, 2 Drawing Sheets

U.S. PATENT DOCUMENTS

| | | | |
|---|---|---|---|
| 2007/0271849 A1* | 11/2007 | Kriese et al. | 49/348 |
| 2008/0155513 A1* | 6/2008 | Ling et al. | 717/135 |
| 2008/0205416 A1* | 8/2008 | DeChiara | 370/401 |
| 2008/0209195 A1* | 8/2008 | Gobbo et al. | 713/1 |
| 2008/0217471 A1* | 9/2008 | Liu et al. | 244/1 R |
| 2009/0184574 A1* | 7/2009 | Zavidniak et al. | 307/9.1 |
| 2009/0323704 A1* | 12/2009 | Hall et al. | 370/401 |
| 2010/0057899 A1* | 3/2010 | Henkel | 709/223 |
| 2010/0086901 A1* | 4/2010 | Fogle | 434/30 |
| 2010/0131149 A1* | 5/2010 | Saugnac et al. | 701/33 |
| 2010/0174522 A1* | 7/2010 | Stunkel et al. | 703/17 |
| 2010/0187903 A1* | 7/2010 | Diab et al. | 307/9.1 |
| 2010/0189120 A1* | 7/2010 | Diab et al. | 370/401 |
| 2010/0195634 A1* | 8/2010 | Thompson | 370/338 |
| 2010/0284313 A1* | 11/2010 | Monnier | 370/294 |
| 2012/0053784 A1* | 3/2012 | Schmidt et al. | 701/33.4 |

* cited by examiner

VIRTUAL PRODUCTION TESTING OF LARGE INTEGRATED PRODUCTS

BACKGROUND

1. Field

The present invention relates to aircraft components. More particularly, the present invention relates to testing various individual aircraft components having an open architecture Ethernet backplane (central communication system) with computing systems prior to joining the aircraft components together.

2. Related Art

During the manufacture of aircrafts, various aircraft components may be manufactured and tested at separate geographic locations prior to being integrated together to form the complete aircraft. For example, one part may be manufactured in New York, while another part is manufactured in Florida, and the parts may be assembled in Washington. To insure that the electrical and communications systems of the aircraft components will properly communicate with each other once they are joined together, a variety of on-site testing equipment is traditionally utilized at each production site. Sometimes multiple types of testing equipment are needed at each production site, and some of the testing equipment can be expensive and/or space-consuming.

If any of the testing equipment at one of the production sites is not calibrated properly or otherwise provides inaccurate readings, the aircraft components may be improperly tested and therefore may not actually communicate properly once they are joined together. The result of such errors may be costly and time-consuming, particularly if components must be shipped back to the original production sites to fix the error.

Therefore an improved system and method for testing aircraft components located in geographically distant locations for communicable compatibility prior to integrating the components together is desired.

SUMMARY

The present invention provides a communications system and method for testing components of an aircraft built at different locations. The communications system may comprise one or more Ethernet links having software and/or hardware controls for timing, buffering, and messaging and a dedicated Ethernet line. The Ethernet links may be configured to communicably link sections of a central communication system housed within the various aircraft components with each other over the Ethernet line. Additionally the Ethernet links may communicably link the various aircraft components with one or more databases over the Ethernet line. Any of the central communication system sections and the databases may be located at geographically distant locations from each other.

The communications system may also comprise at least one software loader communicably linked via Ethernet to one or more of the aircraft components and the databases. Each of the software loaders may be configured to load software into the aircraft components and the database. Additionally, the databases may comprise loadable software. Specifically, the databases may comprise any of loadable software, archived data determined by the testing of the various aircraft components, and aircraft configuration and diagnostic data of one or more lab test vehicles.

A method of testing aircraft components in geographically distant locations from each via Ethernet may connect a first central communication system section associated with or housed within a first aircraft component to a first Ethernet link. Next, a second central communication system section associated with or housed within a second aircraft component may be connected to a second Ethernet link. Additionally, the first and second Ethernet links may be connected to a dedicated Ethernet line such that signals from the first central communication system section may be received by the second central communication system section and vice versa. At least one database may also be linked with the dedicated Ethernet line to communicably couple the database with the first central communication system section and/or the second central communication system section.

These and other important aspects of the present invention are described more fully in the detailed description below.

BRIEF DESCRIPTION OF THE DRAWINGS

Embodiments of the present invention are described in detail below with reference to the attached drawing figures, wherein.

Figure 1:
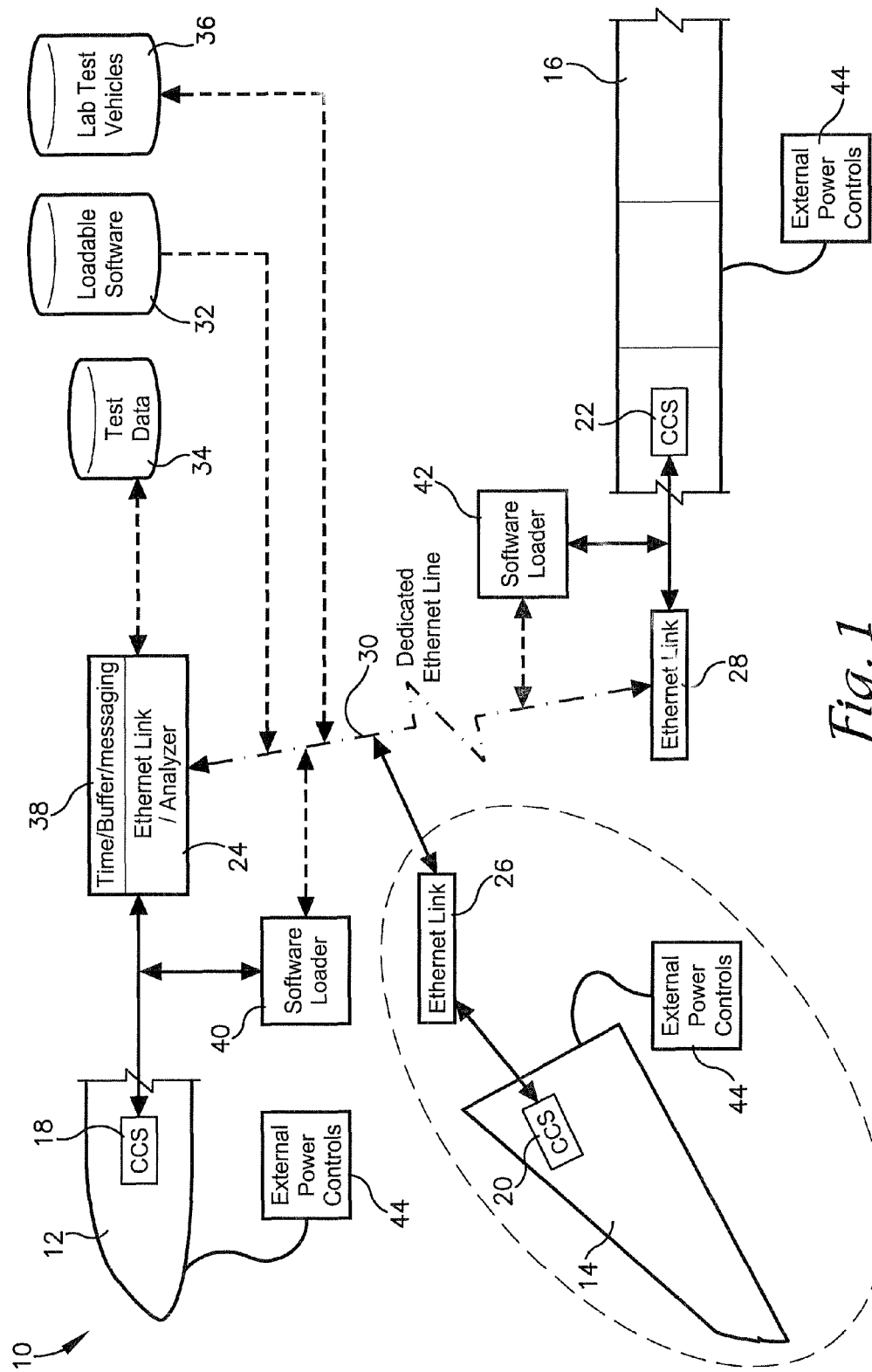
FIG. 1 is a schematic view of a communication system for testing aircraft components in accordance with an embodiment of the present invention.

The drawing figure does not limit the present invention to the specific embodiments disclosed and described herein. The drawing is not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
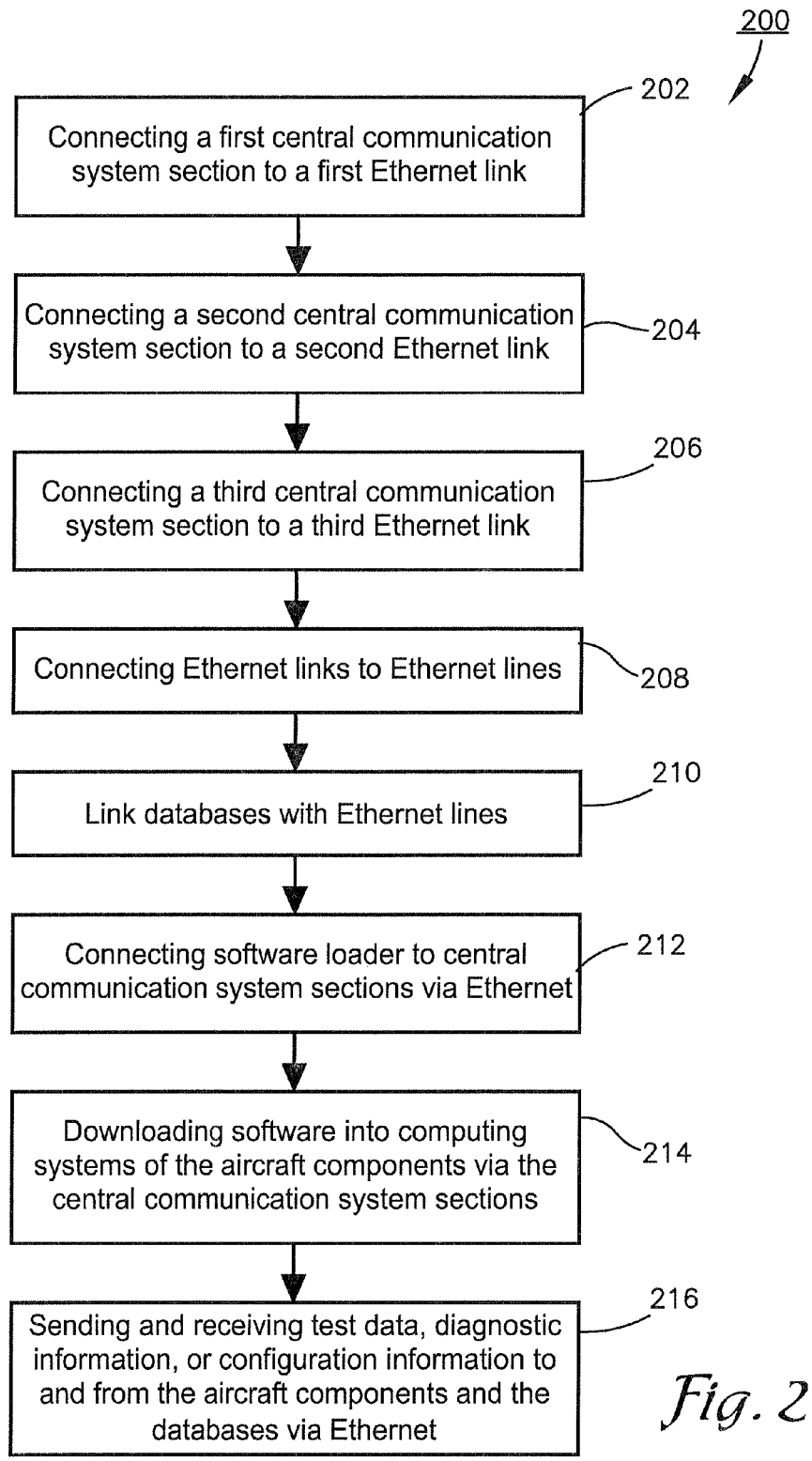
FIG. 2 is a flow chart of a method for testing aircraft components using the system of FIG. 1.

As illustrated in FIGS. 1 and 2, embodiments of the present invention provide a communications system 10 and method 200 for testing a plurality of aircraft components 12,14,16 via Ethernet. Ethernet, as referenced herein may include any networking technology known in the art, including traditional Ethernet, protected Internet, or any electronic distribution system known in the art for transmitting and routing signals through a network. Each of the plurality of aircraft components 12-16, such as wings, fuselages, etc., may comprise one or more sections 18,20,22 of a central communication system of an aircraft. The communications system 10 may comprise one or more Ethernet links 24,26,28 configured to communicably link the central communication system sections 18,20, 22, one or more computing systems, effecting equipment, and/or sensing equipment (not shown) of the aircraft components 12-16 with each other over one or more dedicated Ethernet lines 30. Additionally the Ethernet links 24-28 may communicably link the various aircraft components 12-16 with one or more databases 32,34,36 over the Ethernet lines 30. Any of the aircraft components 12-16 including their corresponding central communication system sections 18-22 and the databases 32-36 may be located at geographically distant locations from each other.

The Ethernet links 24-28 may be any linking hardware known in the art for connecting any type of circuits, hardware, or computing systems to a dedicated Ethernet line. The Ethernet line may be a physical Ethernet hard line and/or a system of satellites or other Ethernet systems wirelessly, communicably coupled with each other. Any delays in sending or receiving signals to and from the various aircraft components could cause an error to occur, so at least one of the Ethernet links 24-28 may comprise software and hardware controls 38 for timing, buffering, and/or messaging to prevent communication failure.

The central communication system sections 18-22 housed within or associated with the aircraft components 12-16 may be configured to actuate and/or monitor the aircraft components 12-16. For example, an effecting component of the central communication system may be located within a cockpit of the aircraft. Additionally, the central communication system sections 18-22 may be configured to send and receive command signals from a primary computing system of the aircraft when all of the aircraft components 12-16 are connected and/or integrated together. For example, a wing of an aircraft may comprise a computing system having an actuator for lowering a flap of the wing or a sensor for determining a wing temperature.

The central communication system sections 18-22 may comprise any combination of circuitry, electrical hardware, optical systems, hydraulic systems, effecting and/or sensing equipment, and computing systems known in the art and may be configured to communicably connect with each other via the Ethernet lines 30 and may be configured to later connect with each other once the aircraft pieces are physically joined together. For example, the ARINC 664 platform may be used by various sections 18-22, computing systems, effecting equipment, and/or sensing equipment of the central communication system for communication between the aircraft components 12-16.

The communications system 10 may also comprise one or more software loaders 40,42 communicably linked via Ethernet to the central communication system sections 18-22 and the databases 32-36. The software loaders 40,42 may be configured to load software into computing systems (not shown) via the central communication system sections 18-22. The software loaders 40,42 may be any software loaders, such as electronic distribution system (EDS) software loaders, for allowing the central communication system sections 18-22 to download new software and for verifying that the software was downloaded correctly. The software loaders 40,42 may both send software to and receive software from any of the Ethernet lines 30 and the databases 32-36.

Any of the databases 32-36 may comprise loadable software, archived test data determined by the testing of the various aircraft components, and/or lab test vehicle data such as aircraft configuration and diagnostic data of one or more lab test vehicles. For example, the communications system 10 may comprise a loadable software database 32, a test data database 34, and a lab test vehicle database 36. However, other databases may be connected to the communications system 10 as required by a given application.

The loadable software may comprise software to function a particular aircraft, and may be updated as needed. For example, the loadable software database 32 may be manipulated with user changes or updates, then the software may be downloaded via the Ethernet lines 30, into any of the aircraft components 12-16. When loading software from the loadable software database 32 or any other source into any of the aircraft components 12-16, the at least one software loader 40,42 may be configured to perform an appropriate firewall breakdown, engage a gateway, and begin dumping software in the appropriate computing system or central communication system section 18-22 of the appropriate aircraft component 12-16. The configuration of the present invention allows software to be loaded efficiently without removing equipment from the aircraft components 12-16.

The test data database 34 may store historical testing data received from any of the aircraft components 12-16 and may send any testing data to any of the aircraft components 12-16. This test data may include time and date information, which aircraft components 12-16 were connected, what signals were sent and/or received by the central communication system sections 18-22 of the aircraft components 12-16, etc.

The test lab vehicle database 36 may receive configuration and diagnostic data from at least one aircraft test lab. When an aircraft is first designed, it may be required by various governmental agencies that all subsystems of the aircraft have a test lab. These test labs generally are required to be maintained for the life of the aircraft. The test labs may have functional interrogators and/or a health system that looks for errors and diagnoses any aircraft problems. Data from such test labs may be distributed to any of the aircraft components 12-16 via the Ethernet lines 30. Additionally, if any of the aircraft components 12-16 are malfunctioning, data from the malfunctioning aircraft component may be sent to the lab via the Ethernet lines 30, and the lab may diagnose the problem.

The communication system 10 may also comprise external power controls 44 configured to provide power locally for computing systems, effecting equipment, and/or sensing equipment in aircraft components 12-16. These external power controls 44 may provide power to the computing systems, effecting equipment, and/or sensing equipment in the aircraft components 12-16 selectively as desired during testing within the aircraft components 12-16. Signals sent to and from the central communication system sections 18-22 may be related to operation of the aircraft components 12-16 and/or monitoring of the aircraft components 12-16. The external power controls 44 may comprise various computing hardware, software, circuits, computer programmable logic, and any power source known in the art.

FIG. 2 illustrates steps in a method 200 for testing the aircraft components 12-16 in geographically distant locations from each other via the Ethernet lines 30. The method may first comprise connecting a first central communication system section 18 associated with or housed within a first aircraft component 12 to a first Ethernet link 24, as depicted in step 202. Next, the method may comprise connecting a second central communication system section 20 associated with or housed within a second aircraft component 14 to a second Ethernet link 26, as depicted in step 204. The method may also comprise connecting a third central communication system section 22 associated with or housed within a third aircraft component 16 to a third Ethernet link 28, as depicted in step 206. Any of the aircraft components 12-16 may be located at different geographic locations. For example, the first aircraft component 12 may be located at a first geographic location while the second aircraft component 14 may be located at a second geographic location, remote from the first geographic location.

Note that any number of sections of the central communication system may be connected to any number of Ethernet links, which may then be communicably connected to the Ethernet lines 30, as depicted in step 208. For example, the method may comprise linking the first, second, and third Ethernet links 24-28 to the Ethernet lines 30 such that signals from the first central communication system section 18 may be received by the second central communication system section 20 and vice versa. Additionally, in this configuration, the third central communication system section 22 may send and receive signals to and from the first and second central communication system sections 18,20. As depicted in step 210, the method may comprise communicably linking the at least one database 32-36 with the Ethernet lines 30 to communicably couple the at least one database 32-36 with at least one of the first, second, and third central communication system sections 18-22.

The method 200 may also include connecting at least one software loader 40,42 to at least one of the central communication system sections 18-22 via Ethernet, as depicted in step 212, and then downloading software into computing systems of the aircraft components 12-16 via the central communication system sections 18-22, as depicted in step 214. Furthermore, the method may include sending and receiving at least one of test data diagnostic information, and configuration information to and from the aircraft components 12-16 and at least one of the databases 32-36 via the Ethernet lines 30, as depicted in step 216. Note that steps of the method 200 may be performed in various orders without departing from the scope of the invention. Additionally, steps may be added or omitted without departing from the scope of the invention.

A key advantage of the communications system 10 and method for testing aircraft components 12-16 is that instead of using a number of pieces of equipment to do electronic testing at each production site for each of the aircraft components 12-16, the aircraft may essentially test itself, even though its components are not physically connected. In this way, the amount of test equipment required for testing aircraft components may be greatly reduced.

Although the invention has been described with reference to the embodiments illustrated in the attached drawings, it is noted that equivalents may be employed and substitutions made herein without departing from the scope of the invention as recited in the claims. For example, while the communications system 10 and method described herein have been described for testing aircraft parts, other large integrated products having electrical and computing components produced at diverse geographic locations or separate production sites may incorporate Ethernet capabilities as described above to test the compatibility of its various components. Furthermore, it should be understood that any number of databases, aircraft components, central communication system sections, Ethernet links, software loaders, and external power controls may be used without departing from the scope of this invention.

Having thus described an embodiment of the invention, what is claimed as new and desired to be protected by Letters Patent includes the following:

1. A method of testing the ability of aircraft components to properly communicate with each other prior to being physically joined together, the method comprising:
   connecting a first central communication system section associated with a first aircraft component at a first geographic location to a first Ethernet link;
   connecting a second central communication system section associated with a second aircraft component at a second geographic location remote from the first geographic location to a second Ethernet link, wherein the first aircraft component is not physically connected to the second aircraft component;
   connecting the first and second Ethernet links to a dedicated Ethernet line such that signals from the first central communication system section are received by the second central communication system section;
   testing the first and second central communication system sections via the dedicated Ethernet line.

2. The method of claim 1, further comprising linking at least one database with the dedicated Ethernet line to communicably couple the at least one database with at least one of the first central communication system section and the second central communication system section.

3. The method of claim 1, wherein the signals from the first central communication system section received by the second central communication system section relate to at least one of operation of the aircraft components and monitoring of the aircraft components.

4. The method of claim 1, further comprising connecting each of the central communication system sections to external power controls configured for creating test signals for the central communication system sections to send to and from each other via the Ethernet line.

5. The method of claim 1, further comprising communicably linking at least one software loader via the Ethernet line to at least one of the aircraft components and the databases, wherein the at least one software loader is configured to load software into at least one of the aircraft components.

6. The method of claim 2, wherein the at least one database archives data determined by testing at least some of the aircraft components.

7. The method of claim 2, wherein the at least one database stores at least one of aircraft configuration data and diagnostic data of one or more lab test vehicles.

8. The method of claim 2, wherein the at least one database comprises loadable software.

9. The method claim 1, wherein at least one of the first Ethernet link and the second Ethernet link comprise any combination of software and hardware controls for timing, buffering, and messaging.

10. The method of claim 1, wherein the first and second central communication system sections and the first and second Ethernet links are configured to communicate according to the ARINC 664 platform.

11. A method of testing a first central communication system section of a first aircraft component at a first production site and a second central communication system section of a second aircraft component located at a second production site to determine if the first and second central communication system sections will properly communicate with each other once the first and second aircraft components are physically joined together, the method comprising:
    connecting the first central communication system section of the first aircraft component to a first Ethernet link;
    connecting the second central communication system section of the second aircraft component to a second Ethernet link;
    connecting the first and second Ethernet links to a dedicated Ethernet line such that signals from the first central communication system section are received by the second central communication system section and vice versa, wherein the signals relate to at least one of operation and monitoring of the aircraft components;
    communicably connecting at least one database with the dedicated Ethernet line such that the at least one database sends data to at least one of the first and second central communication system sections;
    testing the first and second central communication system sections via the dedicated Ethernet line;
    transporting the first and second aircraft components to a common assembly location after the testing of the first and second central communication system sections via the dedicated Ethernet line; and physically joining the first and second aircraft components together at the common assembly location.

12. The method of claim 11, further comprising connecting each of the central communication system sections to external power controls configured for creating test signals for the central communication system sections to send to and from each other via the Ethernet line.

13. The method of claim 11, further comprising communicably linking at least one software loader via the Ethernet line to at least one of the aircraft components and the databases, wherein the at least one software loader is configured to load software into at least one of the aircraft components.

14. The method of claim 11, wherein the at least one database stores at least one of test data, configuration data, diagnostic data, or loadable software.

15. The method claim 11, wherein at least one of the first Ethernet link and the second Ethernet link comprise any combination of software and hardware controls for timing, buffering, and messaging.

16. The method of claim 11, wherein the first and second central communication system sections and the first and second Ethernet links are configured to communicate according to the ARINC 664 platform.

* * * * *